Dec. 26, 1939.   E. BERL   2,184,707
PRESSURE SYNTHESIS OF SULPHURIC ACID
Filed Nov. 18, 1936   2 Sheets-Sheet 2
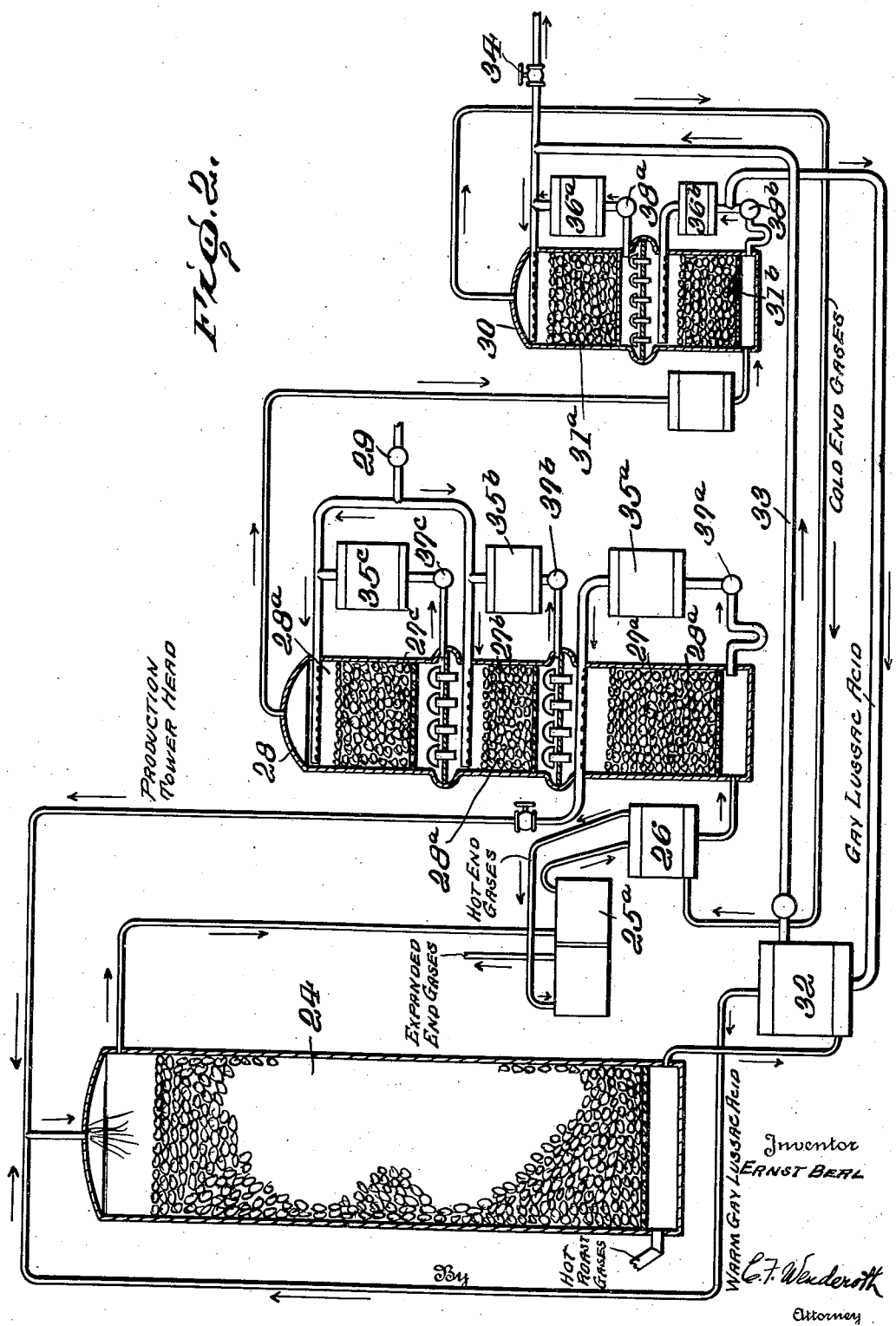

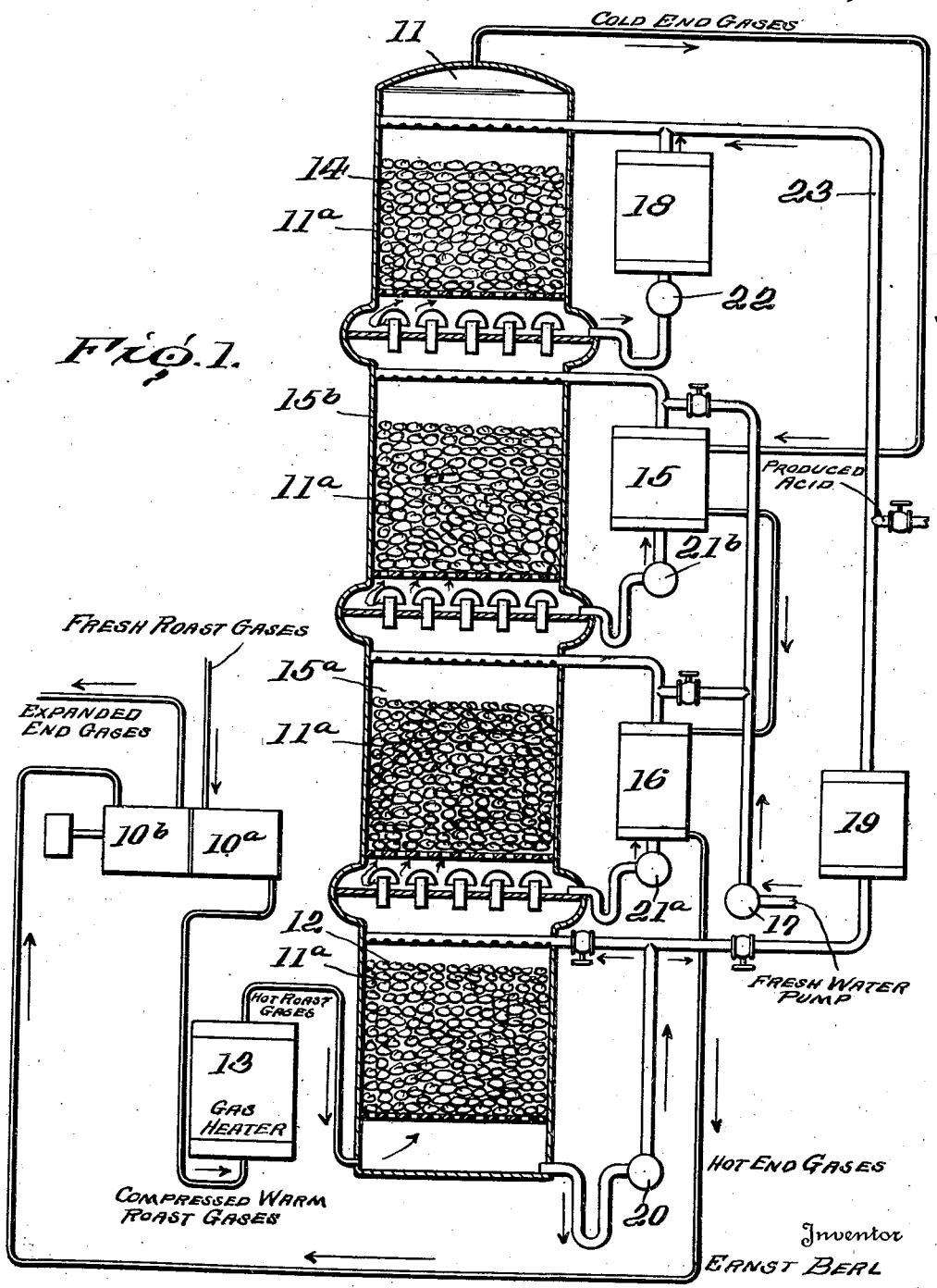

Patented Dec. 26, 1939

2,184,707

UNITED STATES PATENT OFFICE 2,184,707

PRESSURE SYNTHESIS OF SULPHURIC ACID

Ernst Berl, Allegheny County, Pa.

Application November 18, 1936, Serial No. 111,550
In Great Britain November 22, 1935

5 Claims. (Cl. 23—168)

This invention relates to the manufacture of sulphuric acid and more particularly to the manufacture of sulphuric acid in which a solution of nitrosyl sulphuric acid in sulphuric acid of suitable strength (which solution is hereinafter referred to as "nitrose") is used as the oxygen carrier. The invention relates to the method of manufacturing the sulphuric acid and also to the apparatus used.

It is an object of the present invention to provide an improved method of the above type in which the yield of sulphuric acid is increased or the size of the apparatus can be decreased, or both. It is also an object of the invention to reduce the loss of nitrogen compounds, thus reducing the amount of nitrogen compounds which must be added in carrying out the method.

A further object of the invention is to provide apparatus by means of which the improved method can be practiced.

The methods hitherto employed for the manufacture of sulphuric acid in which nitrous gases or nitrosyl sulphuric acid are employed as contact substances necessitate the use of large reaction chambers and lead to the loss of relatively large amounts of nitrogen.

As a result of further investigation and research and in accordance with the present invention, these disadvantages can be completely overcome by carrying out the process in such a manner that the transfer of oxygen to the roast gases and consequently the formation of sulphuric acid takes place under pressure. When pressures of 3 atmospheres and upwards are employed the advantage accruing from this method of working is particularly noticeable and pressures between 30 and 50 atmospheres have been found particularly desirable. Increased pressures give greater yields per unit volume and per unit time. The yield appears to depend on the square of the pressure expressed in atmospheres.

In carrying out the method of the invention, roast gases from sulphur or ores containing sulphur are compressed either before or after conversion of a portion of the sulphur dioxide of said gases to sulphuric acid. The roast gases can be caused to effect in a Glover tower, for example under normal pressure, the denitration of "nitrose" which has been obtained by the pressure process of the invention, and the gases can subsequently be compressed. They are introduced while compressed into apparatus such as, for example, towers packed with filling material in such a manner that they flow in countercurrent or in direct current with solutions of nitrosyl sulphuric acid in sulphuric acid. The concentration of the sulphuric acid may be between about 60% and about 80% and preferably between 65% and 75%. If the concentration is too low, this may cause nitrogen losses through side reactions, and also the cost of concentrating the diluted acid will be high. If the concentration is too high, the reaction will be slow. The movement of the gases and the reaction of the same with the liquid can also be accomplished in accordance with the emulsion principle. An extremely rapid conversion and transfer of oxygen to the sulphur dioxide takes place under pressure. In this manner the large reaction chambers hitherto employed may be considerably reduced in size. The size of the reaction chambers is reduced to a greater extent the higher the pressure and the more intimate the reciprocal action of the gaseous constituents with the reaction liquid and the more completely the heat of reaction is conducted away.

The heat of reaction can be conducted away by cooling with the acid to be denitrated but it is also possible to cool the reaction gases for example, by suitable cooling devices in which the compressed roast gases or the cool end gases may be employed for cooling, or both types of cooling may be combined.

The denitration of the sulphuric acid containing nitrosyl sulphuric acid can be effected with advantage by means of hot roast gases which have not yet been converted. The acids can be denitrated by heating with or without corresponding dilution by means of water or dilute sulphuric acid. In this manner the dissolved nitrogen compounds are obtained in a condition which renders them capable of easy denitration. This denitration process can be carried out under normal or increased pressure.

The compressed gases escaping from the system after practically complete oxidation of the sulphur dioxide are absorbed by cold concentrated sulphuric acid with the formation of nitrosyl sulphuric acid (nitrose). After absorption of the nitric oxides and dilution to the desired concentration the "nitrose" is brought into reciprocal action with the compressed roast gases.

The water necessary for the formation of sulphuric acid by the action of the roast gases on the dissolved nitrosyl sulphuric acid is added to the reaction system at various points. It is partially supplied by the denitration and concentration of the sulphuric acid containing nitrosyl sulphuric acid which has served as the catalyst.

The process may for example be carried out in a high tower or in a series of single towers. It is also possible, however, to employ apparatus of a different type which renders possible intimate contact of the gases with the liquids, for example, apparatus with suitable filling material or mechanically driven stirring devices, emulsion apparatus and the like.

When the described method of working is carried out correctly a practically completely denitrated sulphuric acid results at the entrance of the roast gases and nitrogen losses can be reduced to a minimum. This effect is obtained because of the ready and rapid conversion of nitric oxide into the higher nitric oxides under increased pressure. These higher nitric oxides are readily absorbed under pressure by means of sulphuric acid.

The invention will now be described by way of example with reference to the accompanying drawings.

In the drawings:

Figure 1 is a diagrammatic view of one form of apparatus according to the invention; and Figure 2 is a diagrammatic view of a modified form of apparatus according to the invention.

Referring to Figure 1, ordinary roast gas is compressed by compressor 10a which may be of the turbine-driven type to 10–50 atmospheres and, in the tower generally designated 11, is led into finely dispersed sulphuric acid (70%) containing dissolved nitrosyl sulphuric acid (nitrose). The tower 11 is a pressure resistant reaction tower constructed from suitable material and packed with filling material 11a. In the lower portion 12 of the tower, constituting a Glover tower section, the compressed roast gases which have been heated in heater 13 come into reciprocal reaction with the heated "nitrose" which is formed in the upper portion 14 of the tower constituting a Gay-Lussac tower section. The "nitrose" is completely denitrated especially after the addition of water or dilute sulphuric acid. In the middle part 15a, 15b of the tower where the main production of sulphuric acid is effected, and constituting a production tower section, the heat of reaction is conducted away by suitable cooling arrangements. As shown, the acid is passed through coolers 15 and 16 in countercurrent with the cold compressed end gases from the top of the tower, these coolers acting as heaters for the end gases. The amount of water required to maintain the optimum acid concentration e. g. 65%–75% is introduced at this part of the apparatus by pump 17. The losses of nitrogen compounds may be made up in any usual manner. For example, diluted nitric acid may be introduced as well as water by pump 17. The nitrous gases which escape from the middle portion 15a, 15b of the tower together with the practically completely converted end gases which have lost their sulphur dioxide are brought into reciprocal reaction with cold fresh sulphuric acid containing 72% or more $H_2SO_4$ to ensure a practically complete absorption of the higher nitric oxides. This process takes place under pressure in the upper portion 14 of the tower. The absorption under pressure being much quicker than absorption in the pressure-less process of the prior art.

The temperature range for the reaction may be between room temperature and 120° C., and it is preferable to maintain as low a temperature as possible.

In a suitable apparatus it is possible to obtain production values exceeding 5–40 tons sulphuric acid per cubic metre and per day. These production figures are 1,000 to 10,000 times higher than those obtainable in accordance with older systems.

The loss of nitric acid can be maintained below that obtaining in the older systems which yielded good results under normal pressure, because of the favorable influence exerted by the pressure on the tension of the nitrous acid which is formed in the middle and upper portions of the tower. The end gases which are practically free from nitrous gas and sulphur dioxide can be released and on account of their high nitrogen content can find application as such or in the compressed state. As shown, they can be released in the gas turbine 10b associated with compressor 10a, in order to recover a considerable portion of the energy expended for the compression of the roast gases. As indicated above, the end gases, in this embodiment, pass through the coolers 15, 16 for the acid of the production tower section 15a, 15b. At 18 is shown a cooler for the acid from the Gay-Lussac tower section 14, and at 19 a cooler for the acid from the Glover tower section 12. Pumps are provided at 20 for the Glover acid, at 21a, 21b for the production tower acid, and at 22 for the Gay-Lussac acid. It will be seen that part of the Glover acid is passed to the top of the tower through conduit 23 for absorbing the nitrous gases as already referred to.

It is obvious that instead of a single tower a series of towers may be employed.

Referring to Figure 2, hot roast gases are introduced under normal pressure into a Glover tower 24. The denitration of the "nitrose" is effected therein, if desired or required, after the addition of water. The cold roast gases charged with nitric oxides and steam are compressed in compressor 25a and cooled in cooler 26 by the end gases, resulting in heating of the latter. A certain formation of acid containing "nitrose" takes place. This acid is introduced with the gases containing sulphur dioxide, oxygen, and nitrous gases in the lower compartment 27a of the pressure resistant tower 28 packed with filling material 28a possessing large surface per unit of volume. The formation of sulphuric acid by the oxidation of sulphur dioxide by means of nitrosyl sulphuric acid takes place with great velocity under pressure in compartments 27a, 27b, 27c, the necessary water being introduced at 29. As in the case of the first embodiment, the losses of nitrogen compounds may be made up in any usual manner. For example, diluted nitric acid may be introduced as well as water at 29. A certain proportion of the nitrous gas which escapes from the upper part of the reaction chamber 28 must be absorbed under pressure in cold stronger sulphuric acid in the Gay-Lussac tower 30 having compartments 31a, 31b. The "nitrose" formed in this manner is denitrated, together with newly produced acid in 27a, 27b, 27c, under normal pressure by means of hot roast gases in the Glover tower 24. The denitrated Glover acid is cooled in cooler 32 by interchange with the Gay-Lussac acid. The Glover acid is then returned to the Gay-Lussac tower 30 by conduit 33. The newly produced denitrated acid leaves the system at 34. The end gases, after being heated as indicated above in the roast gas cooler 26, are expanded in gas turbine 25b associated with compressor 25a.

The production tower acid coolers are shown at 35a, 35b, 35c, and the Gay-Lussac acid coolers are shown at 36a, 36b. The production tower acid pumps are shown at 37a, 37b, 37c and the Gay-Lussac acid pumps at 38a, 38b. At 39 is shown a cooler for the gas passing from the production tower 28 to the Gay-Lussac tower 30.

The above examples are illustrative only of the method and apparatus of the invention. They are not to be considered as restrictive as changes may be made without departing from the spirit of the invention as expressed in the appended claims.

I claim:

1. The method of manufacturing sulphuric acid which comprises reacting a solution of nitrosyl sulphuric acid in sulphuric acid with roast gases containing sulphur dioxide at a pressure between about 30 and 50 atmospheres to cause an absorption of said sulphur dioxide in said solution whereby oxidation of said sulphur dioxide by said nitrosyl sulphuric acid occurs in the liquid phase.

2. The method of manufacturing sulphuric acid which comprises reacting a solution of nitrosyl sulphuric acid in sulphuric acid with roast gases containing sulphur dioxide at a pressure between about 30 and 50 atmospheres to cause an absorption of said sulphur dioxide in said solution whereby oxidation of said sulphur dioxide by said nitrosyl sulphuric acid occurs in the liquid phase, and at a temperature between room temperature and 120° C.

3. The method of manufacturing sulphuric acid which comprises reacting a solution of nitrosyl sulphuric acid in sulphuric acid having a concentration from about 60% to about 80% with roast gases containing sulphur dioxide at a pressure between about 30 and 50 atmospheres to cause an absorption of said sulphur dioxide in said solution whereby oxidation of said sulphur dioxide by said nitrosyl sulphuric acid occurs in the liquid phase.

4. The method of manufacturing sulphuric acid which comprises reacting a solution of nitrosyl sulphuric acid in sulphuric acid having a concentration preferably between 65% and 75% with roast gases containing sulphur dioxide at a pressure between about 30 and 50 atmospheres to cause an absorption of said sulphur dioxide in said solution whereby oxidation of said sulphur dioxide by said nitrosyl sulphuric acid occurs in the liquid phase.

5. The method of manufacturing sulphuric acid which comprises reacting a solution of nitrosyl sulphuric acid in sulphuric acid with roast gases containing sulphur dioxide at a pressure above about 30 atmospheres to cause an absorption of said sulphur dioxide in said solution whereby oxidation of said sulphur dioxide by said nitrosyl sulphuric acid occurs in the liquid phase.

ERNST BERL.